United States Patent
Ban et al.

(10) Patent No.: US 6,740,439 B2
(45) Date of Patent: May 25, 2004

(54) COMPOUND-TYPE ENERGY GENERATION SYSTEM

(75) Inventors: Masaki Ban, Saitama (JP); Masahiro Asai, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 248 days.

(21) Appl. No.: 10/095,061

(22) Filed: Mar. 12, 2002

(65) Prior Publication Data
US 2002/0127449 A1 Sep. 12, 2002

(30) Foreign Application Priority Data
Mar. 12, 2001 (JP) .......................... 2001-069227

(51) Int. Cl.[7] .................................. H01M 8/04
(52) U.S. Cl. ............................ 429/26; 429/30; 429/31; 429/34
(58) Field of Search ...................... 429/26, 30, 31, 429/34

(56) References Cited
U.S. PATENT DOCUMENTS
3,683,622 A   8/1972  Von Krusenstierna ....... 60/207
4,371,500 A   2/1983  Papineau .................. 422/115
5,441,401 A   8/1995  Yamaguro et al. ............ 431/4

FOREIGN PATENT DOCUMENTS
DE   199 37 897 A   8/2000
EP   1 048 901 A   11/2000

Primary Examiner—Hoa Van Le
(74) Attorney, Agent, or Firm—Birch, Stewart, Kolasch & Birch, LLP

(57) ABSTRACT

To generate mechanical energy and electrical energy efficiently, by combining a Stirling engine and a fuel cell. A solid electrolyte type fuel cell FC is disposed between an air passage for supplying air to a heater of a Stirling engine E and a fuel passage for supplying fuel. Air and the fuel react with each other in the solid electrolyte type fuel cell FC to generate electrical energy, an off gas containing the unreacted fuel discharged from the solid electrolyte type fuel cell FC is supplied to the heater of the Stirling engine E and subjected to catalytic combustion. The resulting heat is used to operate the Stirling engine E to generate mechanical energy. The solid electrolyte type fuel cell FC is arranged in an annular-shape and so disposed as to surround the heater. The heat of reaction generated in the solid electrolyte type fuel cell FC acts on the heater, thereby contributing to elevation of the temperature of the heater.

18 Claims, 3 Drawing Sheets

COMPOUND-TYPE ENERGY GENERATION SYSTEM

CROSS-REFERENCE TO RELATED APPLICATIONS

The present application claims priority under 35 USC 119 to Japanese Patent Application No. 2001-069227 filed on Mar. 12, 2001 the entire contents thereof are hereby incorporated by reference.

BACKGROUND OF THE INVENTION

1. Field of the Invention

The present invention relates to a compound-type energy generation system which combines a Stirling engine and a fuel cell, whereby mechanical energy and electrical energy can be generated efficiently.

2. Description of Background Art

A compound-type power generation system including a combination of a fuel cell and a gas turbine is disclosed in "Proceedings of The 9th SOFC Research Presentation Meeting, 106B". The compound-type power generation system is so constructed that an unreacted fuel discharged from a fuel cell which performs power generation by a chemical reaction of a fuel is mixed with air, before being combusted in a combustor, and the combustion gas is utilized as a driving source for the gas turbine and a heat source for a fuel reformer, whereby electric power generated by the fuel cell and electric power generated by a generator driven by the gas turbine are efficiently obtained.

The above-mentioned prior art has a problem in that the efficiency of the gas turbine is conspicuously lowered in a partial load condition, so that the purpose of the use of the system is limited to a system capable of steady operation such as a large scale power generation system.

SUMMARY AND OBJECTS OF THE INVENTION

The present invention has been made in consideration of the above-mentioned circumstances, and, accordingly, it is an object of the present invention to efficiently generate mechanical energy and electrical energy by a combination of a Stirling engine and a fuel cell.

In order to attain the above object, according to the present invention there is proposed a compound-type energy generation system including a combination of a Stirling engine and a fuel cell, characterized in that an unreacted gas discharged from the fuel cell is combusted in a heater of the Stirling engine.

According to the above constitution, the unreacted gas discharged from the fuel cell is combusted in the heater of the Stirling engine, so that it is possible to first supply a fuel to the fuel cell to generate electrical energy, and then to use the heat generated by combusting the unreacted gas not reacted in the fuel cell in the heater for generating mechanical energy in the Stirling engine, whereby electrical energy and mechanical energy can be efficiently generated through wasteless utilization of the fuel. In addition, by the combination of the Stirling engine and the fuel cell, the system as a whole can be reduced in size.

According to the present invention, there is proposed a compound-type energy generation system wherein the combustion of the unreacted gas is a catalytic combustion.

According to the above constitution, the unreacted gas discharged from the fuel cell is subjected to catalytic combustion in the heater of the Stirling engine, so that the heater can be reduced in size as compared with the case of using flame combustion, and the limitation as to the positioning of the Stirling engine can be reduced because convection of the unreacted gas due to a flame is absent.

According to the present invention, there is proposed a compound-type energy generation system wherein the periphery of the heater of the Stirling engine is surrounded by the fuel cell which is arranged in an annular-shape.

According to the above constitution, the periphery of the heater of the Stirling engine is surrounded by the annular-shaped fuel cell, so that it is possible to cause the reaction heat generated by the fuel cell to act effectively on the heater, to further elevate the temperature of the heater and thereby to enhance the performance of the Stirling engine.

According to the present invention, there is proposed a compound-type energy generation system wherein the fuel cell is a solid electrolyte type fuel cell.

According to the above constitution, the solid electrolyte type fuel cell is adopted, whereby a reformer for fuel is unnecessitated, and the system can be simplified and reduced in size.

According to the present invention, there is proposed a compound-type energy generation system wherein a Seebeck device is disposed in an exhaust passage of the heater of the Stirling engine.

According to the above constitution, the Seebeck device is disposed in the exhaust passage of the heater, so that it is possible to generate electrical energy by recovering the thermal energy of the exhaust gas of the heater.

Incidentally, the solid electrolyte type fuel cell FC in the embodiment corresponds to the fuel cell in the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Now, a mode for carrying out the present invention will be described below based on an embodiment of the present invention shown in the accompanying drawings.

Figure 1:
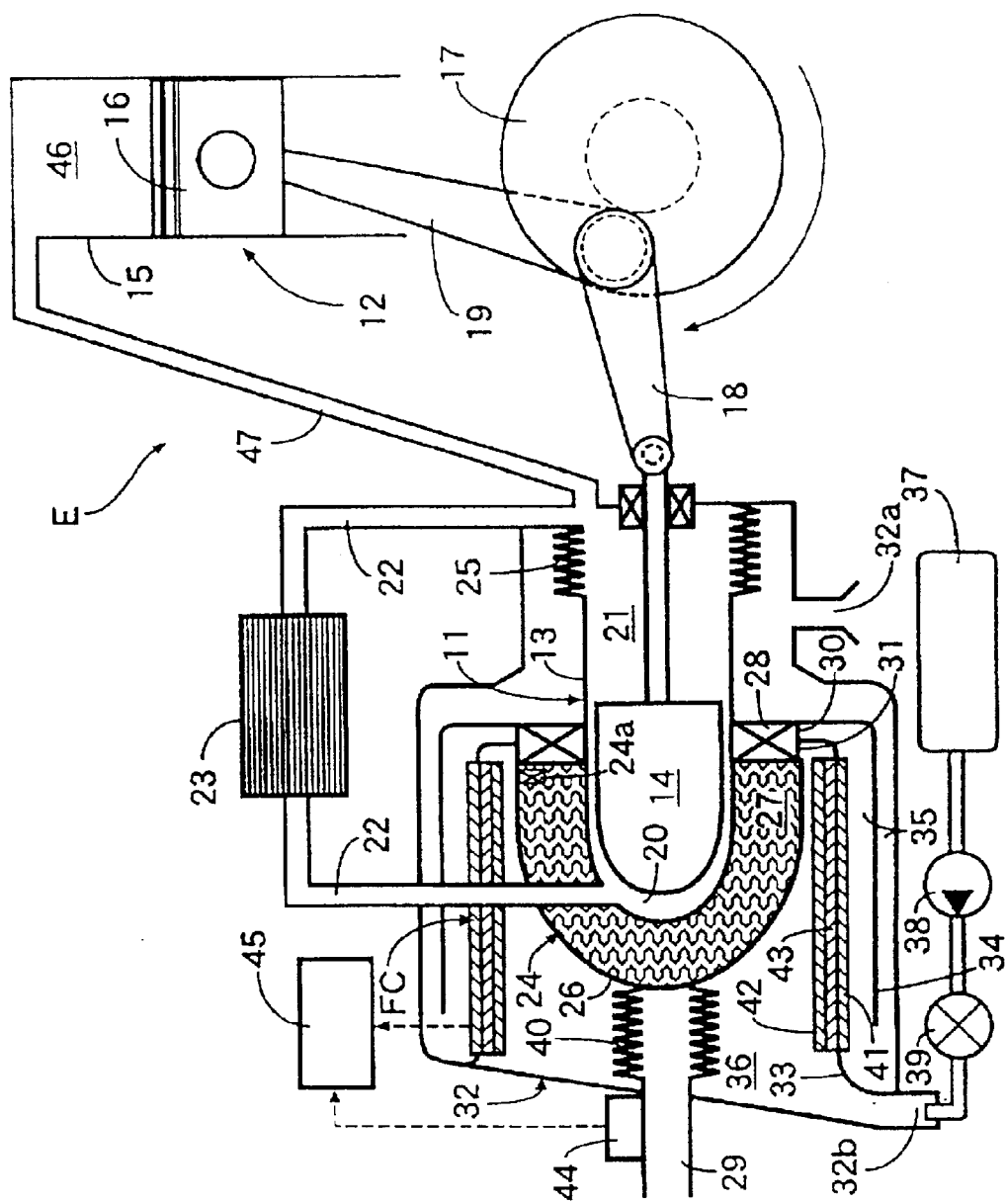
FIG. 1 illustrates the structure of a compound-type energy generation system.

As shown in FIG. 1, the compound-type energy generation system according to the present invention is constituted of a γ-type Stirling engine E, and a solid electrolyte type fuel cell (SOFC) FC incorporated inside of the Stirling engine E.

The Stirling engine E includes a displacer device 11 and a power cylinder device 12 disposed with cylinder axes intersecting roughly at right angles, in which a displacer piston 14 is slidably fitted in a displacer cylinder 13 and a power piston 16 is slidably fitted in a power cylinder 15 and are connected to a common crank shaft 17 functioning as an output shaft respectively through connecting rods 18 and 19. By this arrangement, the displacer piston 14 and the power piston 16 perform reciprocating motions with a mutual phase difference of about 90°.

The interior of the displacer cylinder 13 is partitioned by the displacer piston 14 into an expansion chamber 20 on the head portion side and a compression chamber 21 on the bottom portion side. A regenerator 23 is provided in a communication passage 22 connecting the expansion chamber 20 and the compression chamber 21. A heater 24 is provided in the periphery of the expansion chamber 20, while a radiator 25 is provided in the periphery of the compression chamber 21. The regenerator 23 has a honeycomb structure capable of heat storage and heat radiation, and absorbs the heat deprived of a high temperature working gas when the high temperature working gas in the expansion chamber 20 heated by the heater 24 is moved through the communication passage 22 to the side of the compression chamber 21 by a movement of the displacer piston 14 to the left in FIG. 1. The regenerator 23 gives the heat stored therein out to a low temperature working gas when the low temperature working gas in the compression chamber 21 cooled by the radiator 25 is moved through the communication passage 22 to the side of the expansion chamber 20 by a movement of the displacer piston 14 rightwards in FIG. 1.

A working chamber 46 is partitioned between the power cylinder 15 and the power piston 16. The power cylinder device 12 is communicated to the compression chamber 21 of the displacer device 11 through a communication passage 47.

The heater 24 consisting of a catalytic combustor includes an oxidation catalyst 27 packed in a combustion chamber 26 surrounding the expansion chamber 20. A fuel-air mixer 28 is provided at one end portion of the combustion chamber 26. An exhaust passage 29 is provided at the other end portion of the combustion chamber 26. Here, the oxidation catalyst 27 is borne also by a head portion of the displacer cylinder 13. The fuel-air mixer 28 includes an air supply port 30 and a fuel supply port 31 disposed adjacent to each other. The heater 24 is provided with an ignition plug 24a at a position adjacent to the fuel-air mixer 28.

The periphery of the displacer device 11 and the heater 24 is covered with a shroud 32, which is provided with an air inlet port 32a at a position close to the radiator 25 and with a fuel inlet port 32b at a position close to the exhaust passage 29. Inside of the shroud 32, a first partition wall 33 surrounds the combustion chamber 26 and a second partition wall 34 surrounding the first partition wall 33. The first and second partition walls 33, 34 and the shroud 32, an air passage 35 connecting the air inlet port 32a and the air supply port 30 provide a meandering passageway wherein a fuel passage 36 connects the fuel inlet port 32b and the fuel supply port 31 along the combustion chamber 26. Ethyl alcohol as a fuel contained in a fuel tank 37 is supplied to the fuel inlet port 32b through a fuel pump 38 and a flow rate regulator 39. A radiator 40 is provided around the periphery of the exhaust passage 29 so as to front on the fuel passage 36.

Figure 2:
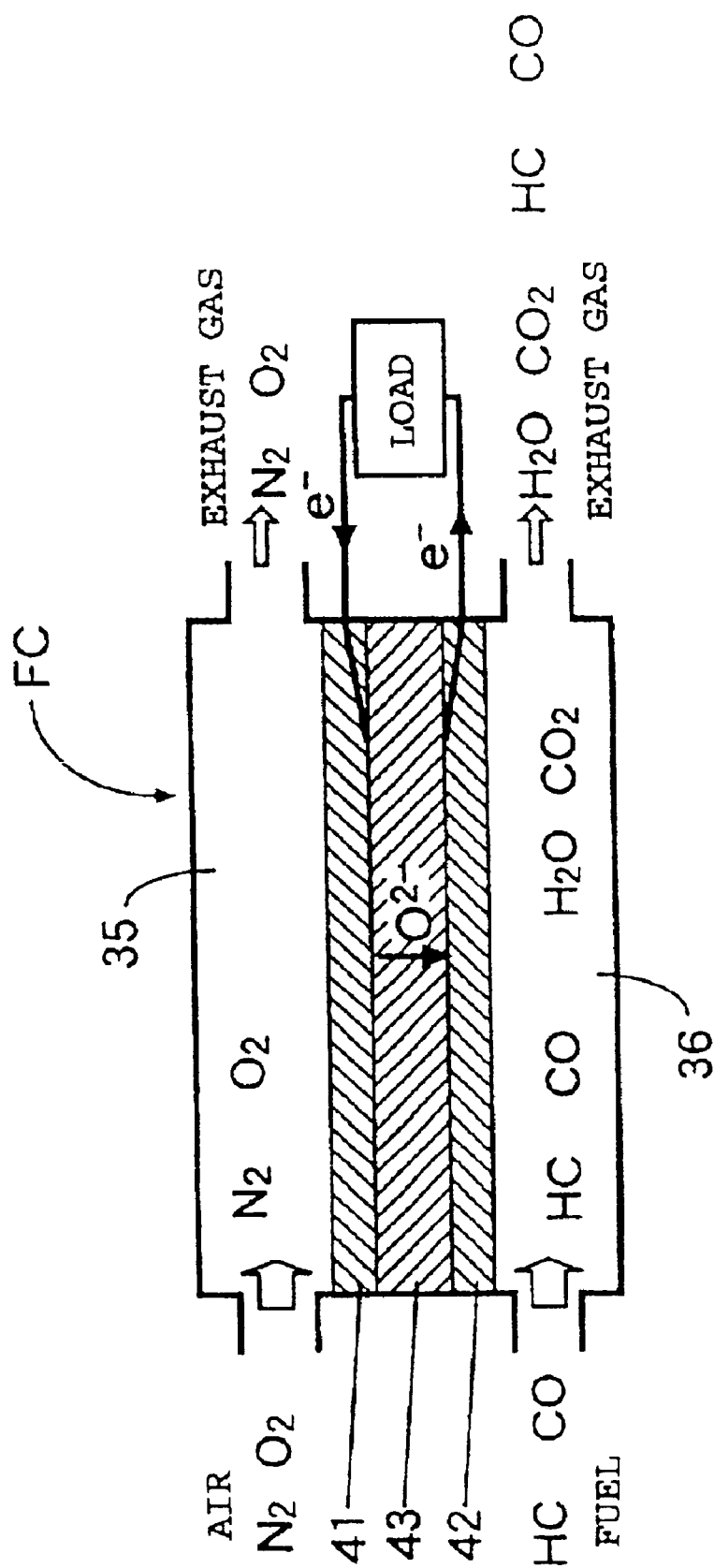
FIG. 2 illustrates the structure of a solid electrolyte type fuel cell.

As is apparent from referring also to FIG. 2, a solid electrolyte type fuel cell FC is of an annular-shape so as to surround the heater 24 and is provided at the above-mentioned first partition wall 33. The solid electrolyte type fuel cell FC includes a solid electrolyte element 43 sandwiched between an air pole 41 and a fuel pole 42. The air pole 41 is disposed to front on the air passage 35. The fuel pole 42 is disposed to front on the fuel passage 36. $O_2$ and $N_2$ flow through the air passage 35 fronting on the air pole 41, whereas HC and CO and formed by self-reforming of the alcohol flow through the fuel passage 36 fronting on the fuel pole 42. HC and CO react with $O_2$ through the solid electrolyte element 43 to generate an electromotive force and, at the same time, a heat of reaction. Since the solid electrolyte type fuel cell FC causes self-reforming of the alcohol, a special reformer is not needed, so that the system can be simplified and reduced in size. The degree of conversion of HC and CO in the solid electrolyte type fuel cell FC is 50 to 70%, and 30 to 50% of HC and CO as unreacted components are supplied to the heater 24.

A Seebeck device 44 is provided at the outer periphery of the exhaust passage 29 extended from the shroud 32 to the exterior. The Seebeck device 44 generates an electromotive force from the temperature difference between a high temperature exhaust gas passing through the exhaust passage 29 and low temperature atmospheric air. The electric power generated by the solid electrolyte type fuel cell FC and the Seebeck device 44 serves to, for example, charge a battery 45.

Figure 3:
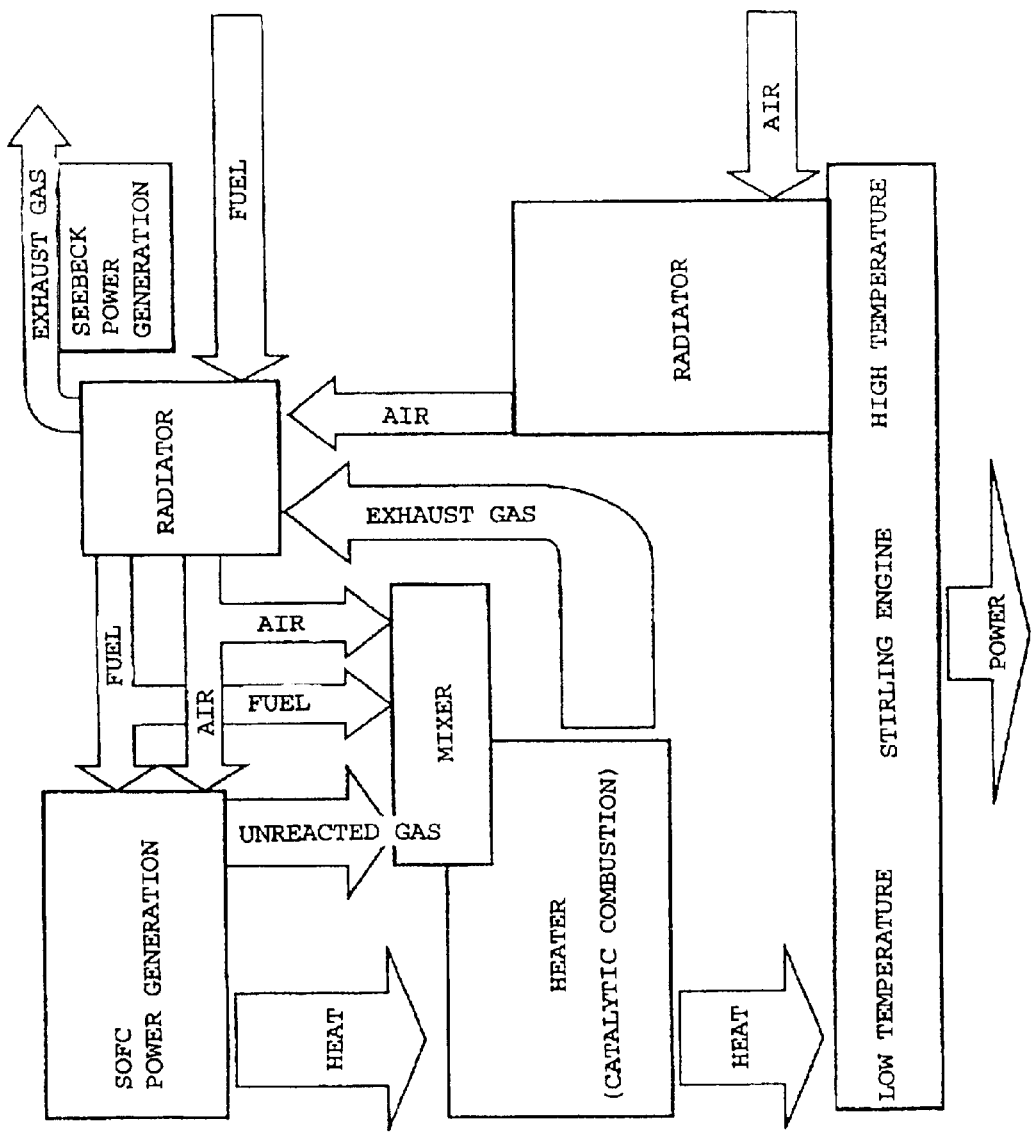
FIG. 3 illustrates the action of the compound-type energy generation system.

Next, the action or effect of the present embodiment will be described referring to FIGS. 1 and 3. Fuel is supplied from the fuel tank 37 through the fuel pump 38, the flow rate regulator 39 and the fuel inlet port 32b into the fuel passage 36 of the shroud 32. The fuel is preheated by receiving the heat radiated from the radiator 40 provided in the exhaust passage 29 passing through the fuel passage 36, the heat radiated from the heater 24, and the heat radiated from the solid electrolyte type fuel cell FC. In the preheated condition, a portion of the fuel is supplied into the fuel passage 36 of the solid electrolyte type fuel cell FC. On the other hand, the air supplied through the air inlet port 32a of the shroud 32 into the air passage 35 is preheated by receiving the heat radiated from the radiator 25 of the displacer device 11. The heat radiated from the radiator 40 is provided in the exhaust passage 29, and the heat radiated from the solid electrolyte type fuel cell FC. In the preheated condition, a portion of the air is supplied into the air passage 35 of the solid electrolyte type fuel cell FC.

In the solid electrolyte type fuel cell FC, HC and CO react with $O_2$ to generate electric power, which is used to charge the battery 45. The heat generated by the solid electrolyte type fuel cell FC attendant on the power generation is not only utilized for preheating of the fuel and air, but also utilized to externally heat the heater 24 disposed on the inside of the solid electrolyte type fuel cell FC.

The fuel and air not passing through the solid electrolyte type fuel cell FC and an off gas containing the unreacted fuel having passed through the solid electrolyte type fuel cell FC are mixed by the fuel-air mixer 28, and the mixture is supplied to the heater 24. The fuel, air and off gas supplied to the heater 24 undergo catalytic combustion by making contact with the oxidation catalyst 27, and the resulting exhaust gas is discharged into the exhaust passage 29. The heat generated by the heater 24 heats the working gas in the expansion chamber 20 of the displacer device 11 surrounded by the heater 24. Incidentally, the ignition plug 24a is used at the time of initially igniting the fuel. After the fuel is ignited, the catalytic combustion by the oxidation catalyst 27 is continued. By thus performing the catalytic combustion by the oxidation catalyst 27 in the heater 24, the heater 24 can be reduced in size as compared with the case of flame combustion; in addition, since convection due to a flame is absent, limitations on the positioning of the Stirling engine E can be reduced.

The heat of the high temperature exhaust gas passing through the exhaust passage 29 is radiated from the radiator 40, to be utilized for preheating of the fuel in the fuel passage 36 and preheating the air in the air passage 35. The heat is utilized for power generation in the Seebeck device 44, and the generated electric power is used to charge the battery 45. By performing power generation by the Seebeck device 44, the thermal energy of the exhaust gas from the heater 24 can be effectively utilized to generate electric power.

The expansion chamber 20 of the displacer device 11 is heated by the heater 24 as described above, and the compression chamber 21 of the displacer device 11 is cooled through exchange of heat with air at the radiator 25, whereby the Stirling engine E can be operated. Namely, when the displacer piston 14 is moved to the left in FIG. 1 and the heat of the high temperature working gas is pushed out from the expansion chamber 20 and is absorbed by the regenerator 23, the working gas is brought to a low temperature and the pressure in the space (the expansion chamber 20, the compression chamber 21, the communication passage 22 and the regenerator 23) where the working gas is present is lowered. On the other hand, when the displacer piston 14 is moved to the right in FIG. 1 and the heat having been absorbed into the regenerator 23 is given to the low temperature working gas pushed out from the compression chamber 21, the working gas is brought to a high temperature and the pressure in the space where the working gas is present is raised.

Therefore, when the phase of the power piston 16 opposed to the working chamber 46 of the power cylinder device 12 is in communication with the above-mentioned space through the communication passage 47 is set to be in a compression stroke at the time of low pressure of the working gas and is in an expansion stroke at the time of high pressure of the working gas, namely, when the displacer piston 14 and the power piston 16 are set to have a phase difference of about 90°, mechanical energy can be taken out from the crank shaft 17 connected to the power piston 16.

Thus, by the combination of the Stirling engine E and the solid electrolyte type fuel cell FC, the system as a whole can be reduced in size, and a high output can be generated. In addition, since the fuel unreacted in the solid electrolyte type fuel cell FC is combusted in the heater 24 to be utilized as a heat source for the Stirling engine E, the fuel can be utilized wastelessly to thereby generate electrical energy and mechanical energy efficiently. Further, since the annular-shaped solid electrolyte type fuel cell FC surrounds the periphery of the heater 24 of the Stirling engine E, the heat of reaction in the solid electrolyte type fuel cell FC can be made to act on the heater 24 effectively, whereby the temperature of the heater 24 is further raised, and the output of the Stirling engine E can be increased.

While the embodiment of the present invention has been detailed above, various design modifications can be made without departure from the gist of the present invention.

For example, while the γ-type Stirling engine E has been exemplified in the embodiment, the present invention can be applied also to an α-type or β-type Stirling engine.

In addition, the Stirling engine E is not limited to that wherein the output is taken out from the crank shaft 17, and may be an actuator such that an input to the displacer piston 14 is taken out as an output from the power piston 16.

Besides, while a portion of the fuel and air supplied into the shroud 32 is supplied to the solid electrolyte type fuel cell FC and the remainder is supplied directly to the heater 24 in the embodiment, the whole amount of the fuel and air may be supplied to the solid electrolyte type fuel cell FC and then to the heater 24.

In addition, in place of the solid electrolyte type fuel cell FC, other kinds of fuel cells such as a solid polymer type fuel cell (PEFC) can be adopted.

Besides, while the electric power generated by the solid electrolyte type fuel cell FC and the Seebeck device 44 is used to charge the battery 45 in the embodiment, the use of the electric power generated is arbitrary.

As described above, according to the present invention, the unreacted gas discharged from the fuel cell is combusted in the heater of the Stirling engine, so that it is possible to first supply the fuel to the fuel cell so as to generate electrical energy and then to combust the unreacted gas not reacted in the fuel cell in the heater so as to generate heat with which the Stirling engine generates mechanical energy, whereby the fuel can be utilized wastelessly to thereby generate electrical energy and mechanical energy efficiently. In addition, by the combination of the Stirling engine and the fuel cell, the system as a whole can be reduced in size.

In addition, according to the present invention, the unreacted gas discharged from the fuel cell is subjected to catalytic combustion in the heater of the Stirling engine, so that the heater can be reduced in size as compared with the case of flame combustion, and, since convection of the unreacted gas due to a flame is absent, limitations on the positioning of the Stirling engine can be reduced.

Further, according to the present invention, the periphery of the heater of the Stirling engine is surrounded by an annular-shaped fuel cell, so that the heat of reaction generated in the fuel cell can be made to act on the heater effectively, thereby further raising the temperature of the heater and enhancing the performance of the Stirling engine.

Still further, according to the present invention, a solid electrolyte type fuel cell is adopted, whereby a reformer for the fuel is not needed, and the system can be simplified and reduced in size.

In addition, according to the present invention, a Seebeck device is disposed in the exhaust passage of the heater, so that the thermal energy of the exhaust gas of the heater can be recovered to thereby generate electrical energy.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A compound-type energy generation system comprising:
   a Stirling engine (E); and
   a fuel cell (FC);
   wherein an unreacted gas discharged from said fuel cell (FC) is combusted in a heater of said Stirling engine (E).

2. The compound-type energy generation system according to claim 1, wherein the combustion of said unreacted gas is catalytic combustion.

3. The compound-type energy generation system according to claim 1, wherein the periphery of said heater of said Stirling engine (E) is surrounded by said fuel cell (FC) which is an annular-shape.

4. The compound-type energy generation system according to claim 2, wherein the periphery of said heater of said Stirling engine (E) is surrounded by said fuel cell (FC) which is an annular-shape.

5. The compound-type energy generation system according to claim 1, wherein said fuel cell (FC) is a solid electrolyte type fuel cell.

6. The compound-type energy generation system according to claim 2, wherein said fuel cell (FC) is a solid electrolyte type fuel cell.

7. The compound-type energy generation system according to claim 3, wherein said fuel cell (FC) is a solid electrolyte type fuel cell.

8. The compound-type energy generation system according to claim 4, wherein said fuel cell (FC) is a solid electrolyte type fuel cell.

9. The compound-type energy generation system according to claim 1, wherein a Seebeck device is disposed in an exhaust passage of said heater of said Stirling engine (E).

10. The compound-type energy generation system according to claim 2, wherein a Seebeck device is disposed in an exhaust passage of said heater of said Stirling engine (E).

11. The compound-type energy generation system according to claim 3, wherein a Seebeck device is disposed in an exhaust passage of said heater of said Stirling engine (E).

12. The compound-type energy generation system according to claim 4, wherein a Seebeck device is disposed in an exhaust passage of said heater of said Stirling engine (E).

13. The compound-type energy generation system according to claim 5, wherein a Seebeck device is disposed in an exhaust passage of said heater of said Stirling engine (E).

14. A compound-type energy generation system comprising:

a Stirling engine (E) including a heater with a displacer device operatively positioned therein, said displacer device being connected to a power cylinder; and a fuel cell (FC) operatively mounted relative to said Stirling engine, said fuel cell including an air pole disposed to an air passage a fuel cell disposed to a fuel passage, wherein $O_2$ and $N_2$ flow through the air passage and HC and CO flow through the fuel passage to react to form an electromotive force;

wherein an unreacted gas discharged from said fuel cell (FC) is combusted in the heater of said Stirling engine (E).

15. The compound-type energy generation system according to claim 14, wherein the combustion of said unreacted gas is catalytic combustion.

16. The compound-type energy generation system according to claim 14, wherein the periphery of said heater of said Stirling engine (E) is surrounded by said fuel cell (FC) which is an annular-shape.

17. The compound-type energy generation system according to claim 14, wherein said fuel cell (FC) is a solid electrolyte type fuel cell.

18. The compound-type energy generation system according to claim 14, wherein a Seebeck device is operatively disposed in an exhaust passage of said heater of said Stirling engine (E).

* * * * *